United States Patent Office 3,485,570
Patented Dec. 23, 1969

3,485,570
ISOLATION OF TRISAZO DYESTUFFS
Kurt Breig, Cologne-Flittard, Walter Blum, Bensberg, Gerd Müller, Cologne-Flittard, and Hans Raab and Günther Steinmetz, Cologne-Stammheim, Germany, assignors to Farbenfabriken Bayer Aktiengesellschaft, Leverkusen, Germany, a corporation of Germany
No Drawing. Filed Mar. 9, 1966, Ser. No. 532,857
Claims priority, application Germany, Mar. 16, 1965, F 45,534
Int. Cl. C09b 31/22, 41/00
U.S. Cl. 8—41                               2 Claims

ABSTRACT OF THE DISCLOSURE

A process for recovering black trisazo dyestuffs which comprises spray-drying a solution consisting essentially of the dyestuff which solution results from the final coupling step in the production of the dyestuff. The process is particularly applicable to the dyestuffs CI Acid Black 94 and 69.

---

In the dyeing of leather the dyestuffs CI Acid Black 94 (Colour Index, second Edition, Supplement 1963, page 634, No. 30,336) and CI Acid Black 69 (Colour Index, second Edition, volume 3, page 3262, No. 30,260) have attained special importance for dyeing leather deep black, since they possess a number of outstanding properties. Besides being very readily soluble, even in cold water, the dyestuffs are insensitive to organic and inorganic acids and have an appreciably good affinity for leather tanned in any way. When dyeing is carried out in a liquor, leather tanned with mineral or vegetable agents or by a combined process can be dyed satisfactorily. However, it has now been found that in the case where white and black leather is processed simultaneously and the latter has been dyed with the above dyestuffs, a strong red discolouration occurs on the white leather. Detailed investigations have shown that placing the two types of leather against one another already suffices for the red discolouration to become visible on the white leather after some time. This tendency to colour the paler leather constitutes a substantial disadvantage for the handling and processing of black leather dyed with the above dyestuffs.

It has now been found that these disadvantageous properties of the dyestuffs CI Acid Black 94 and CI Acid Black 69 can be removed or strongly reduced, when the aqueous-alkaline dyestuff solutions or suspensions obtained after the preparation of the dyestuff are immediately subjected to spray-drying, without previous isolation of the dyestuff. If suitable additives for adjusting the desired shade and colour strength are introduced into the reaction vessel in which the dyestuffs are obtained after coupling of the reaction components, then end products are obtained, which are ready for sale.

The new method of isolation also presents the advantage of saving the processes of separating the dyestuffs by means of filter presses from the solutions in which they are formed, drying in labour-consuming devices, and in the case where standardising agents and shading components are added to the reaction solution, also of mixing and grinding. Spray driers with pressure spraying yield the dyestuffs in the form of a granulate which is poor in dust and superior to the conventional powdered form in respect of handling and dyeing technique. In particular, the solubility of the resultant dyestuffs is improved, since the dyestuffs are dried according to the new process in the form of their alkali metal salts, whereas they were separated according to the conventional methods by the addition of hydrochloric acid before being isolated by means of a filter press (cf. German patent specification No. 582,399, Example 2).

Compared with the conventional processes for the isolation of dyestuffs, the process according to the invention moreover presents the advantage of being substantially less labour-consuming, due to extensive automation. It also offers an ideal solution of the increasingly urgent waste water problem, since it is no longer necessary to drain the waste liquors of the coupling reaction.

The discovery that such a process can be applied to the industrial production of water-soluble azo dyestuffs is extremely surprising, since it was to be assumed and has, indeed, always been taken for granted that the by-products which are formed in the production of dyestuffs and were separated according to the previous method of operation from the precipitated dyestuff in the filtrate (mother liquor or waste liquor) would affect the quality or dyeing properties of the final dyestuff in an undesirable manner. However, it has now been found that in the present case the quality of the dyestuffs is improved instead of being reduced.

The following examples are given for the purpose of illustrating the invention.

Example 1

An alkaline solution of the dyestuff CI Acid Black No. 30,336 is obtained according to Example 2 of German patent specification No. 582,399 which illustrates the process of coupling tetrazotized benzidine in mineral acid medium with 1-amino-8-hydroxynaphthalene-3,6-disulphonic acid, further coupling the diazo-azo compound in alkaline medium with diazotized 1-aminobenzene-4-sulphonic acid finally coupling the diazo-disazo compound with 1-hydroxy-3-o-methylphenyl-aminobenzene to form CI Acid Black 94 and the process of coupling tetrazotized benzidine in mineral acid medium with 1-amino-8-hydroxynaphthalene-3,6-disulphonic acid, further coupling the diazo-azo compound in alkaline medium with diazotized 1-amino-benzene-4-sulphonic acid and finally coupling with 1-diethylamino-3-acetylaminobenzene to form CI Acid Black 69 after completion of the last coupling.

A sample of this solution is examined for its colour strength and shade. After addition of the amount of standardising material required for attaining the colour strength of the standardized type, the dyestuff solution is passed into a spray drier. Drying is carried out according to the instructions customary for these devices. A dyestuff powder is obtained which has a residual moisture content of 1–3% and is ready for sale: the dyestuff is appreciably superior to the dyestuff isolated by conventional methods in respect of its water-solubility: leather which has been dyed black with this dyestuff colours accompanying white leather only to a negligible extent, or not at all.

It is also possible to proceed in this example in such a manner that the standardising agents and, possibly, the shading dyestuffs required for adjusting the colour strength and shade desired for the end product, are not added to the coupling solution, but that the coupling solution of the dyestuff CI Acid Black No. 30,336 is spray-dried without these additives and the spray-dried dyestuff subsequently treated with the additives by mixing, grinding and the like.

Example 2

The dyestuff CI Acid Black No. 30,260 is prepared in known manner (the reaction sequence being, in principle, the same as that for CI Acid Black No. 30,336). The alkaline solution of the final dyestuff obtained after the last coupling is examined for its shade and colour strength by withdrawing a sample, and subsequently adjusted to the standardised commercial type by the addition of definite amounts of standardising agents and shading dyestuffs. The solution is then passed into a spray drier which yields the dyestuff ready for sale. Compared with the dyestuff isolated by conventional methods, this product is characterised by an improved solubility and reduced rubbing off of the black leather on to white leather.

As standardising materials there may be used in Examples 1 and 2, for instance, salt, like rock salt (NaCl) and sodium sulphate, dextrin, phosphates, like sodium hexameta-phosphate and trisodium phosphate, the sodium salt of benzene sulphonic acids and sodium carbonate; suitable shading dyestuffs are, for instance, the dyestuffs CI 40,000, CI 30,280 and CI 22,590 (Colour Index second edition).

We claim:

1. In a process for preparing black trisazo dyestuffs CI Acid Black 94 obtained by coupling tetrazotized benzidine in mineral acid medium with 1-amino-8-hydroxynaphthalene-3,6-disulphonic acid, further coupling the diazo-azo compound in alkaline medium with diazotized 1-aminobenzene-4-sulphonic acid and finally coupling the diazodisazo compound with 1 - hydroxy - 3 - o - methylphenylaminobenzene to form the trisazo dyestuff; or CI Acid Black 69 obtained by coupling tetrazotized benzidine in mineral acid medium with 1-amino-8-hydroxynaphthalene-3,6-disulphonic acid, further coupling the diazo-azo compound in alkaline medium with diazotized 1-aminobenzene-4-sulphonic acid and finally coupling with 1-diethylamino-3-acetylaminobenzene to form the trisazo dyestuff; the improvement which comprises directly spray drying the reaction mixture containing the unpurified dyestuff resulting from the last coupling step.

2. The process according to claim 1 further comprising the step of adding minor proportions of standardizing agents and/or shading dyestuffs to the unpurified dyestuff mixture prior to spray-drying said solution or suspension.

References Cited

UNITED STATES PATENTS

| | | | |
|---|---|---|---|
| 2,819,258 | 1/1958 | Schmid | 8—79 |
| 2,070,739 | 2/1937 | Krauss et al. | 8—79 |
| 2,574,597 | 11/1951 | Salvin et al. | 260—208 |

NORMAN G. TORCHIN, Primary Examiner

J. E. CALLAGHAN, Assistant Examiner

U.S. Cl. X.R.

8—79; 260—208